May 9, 1950 — C. O. EVANS — 2,507,201
TOOL FOR REMOVING TUBES FROM TUBE SHEETS
Filed Sept. 17, 1946
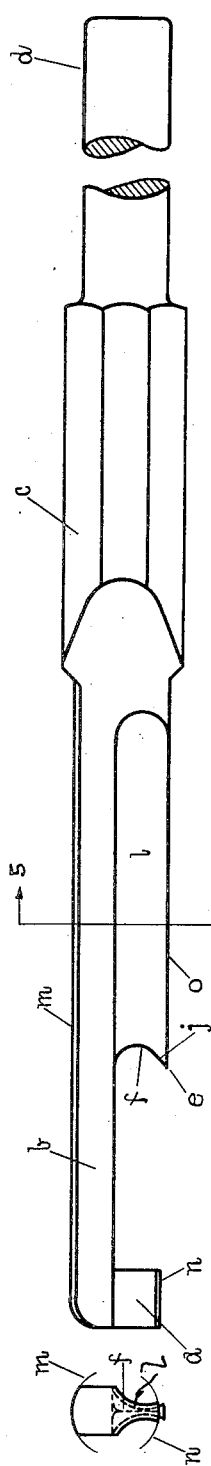
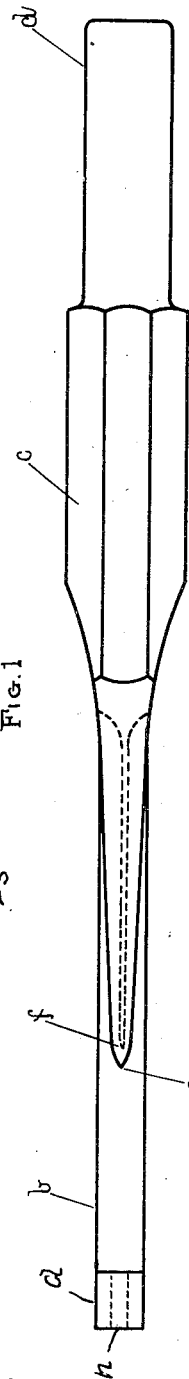
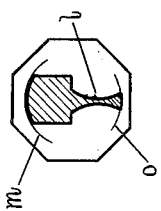
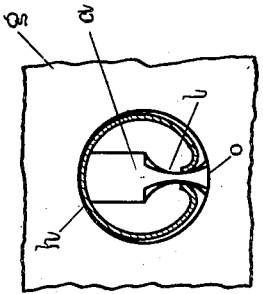
C. O. Evans
INVENTOR
ATTORNEY Patented May 9, 1950

2,507,201

UNITED STATES PATENT OFFICE 2,507,201

TOOL FOR REMOVING TUBES FROM TUBE SHEETS

Clair Otto Evans, New York, N. Y.

Application September 17, 1946, Serial No. 697,558

4 Claims. (Cl. 30—91)

1

This invention relates to tools for removing tubes from tube sheets, more particularly to tools that will remove a tube without damage to the holes in the tube sheet or plate, and has for its object the production of a tool that will facilitate the removal and the replacement of tubes in a less period of time than by any known method now in use.

A further object is to produce a tool for breaking the bond between the tube sheet and the tube and the removal of the tube without any damage to the tube plates or sheets. By using this new tool expensive and valuable equipment can be taken out of service for retubing and put back into service in a less period of time than heretofore experienced, and because of no scoring, scarfing or other deformation of the holes of the tube sheets, the life of the tube sheets and consequently the heat exchanger is greatly increased.

In tubular heat-exchanger units, consisting of an outer shell, tubes and tube plates, the tubes are more generally rolled or expanded into the tube plates and securely bonded by friction grip between the outside diameter of the tube and inside surface of the hole in the tube sheet or plate to prevent leakage at these points.

Such units are used in a multiplicity of services, such as in the petroleum industry to exchange heat from a vapor to a liquid, or vice versa, or to exchange heat from one liquid to another or to condense moisture laden gases. Such exchanger units are also used to condense steam from prime movers in power houses, to generate steam or to heat water or other liquids.

In service it is necessary to renew the tubes in heat exchangers from time to time, due to corrosion, obsolescence or wear on the tubes.

The customary process in effect today, to reduce or break the bond between the tube end and the hole in the tube plate, consists of boring out, crimping or distorting the tube end or ends or other equally inefficient and laborious operations so that the old tubes may be removed and replaced by new tubes.

Under these undesirable methods it is almost impossible to remove a bundle or set of tubes without damaging the holes in the tube plate by scoring, scarfing or other types of deformation, all of which lessens or destroys the effectiveness of the bond between the ends of the new tubes and the holes in the tube plates after replacements are made.

The foregoing and other features of my invention will now be described in connection with the accompanying drawing forming part of this specification in which I have represented my tool in its preferred form, after which I shall point out in the claims those features which I believe to be new and of my own invention.

In the drawings:

Figure 1 is a side elevation of a tool embodying the invention.

Figure 2 is a longitudinal view similar to that shown in Figure 1, but at right angles to that shown in Figure 1.

Figure 3 is an enlarged view in part cross-section showing the tool in position for operating within a tube sheet and about to plow and slit the wall of the tube.

Figure 4 is an end of the tool within the tube sheet, looking from the right end of Figure 3.

Figure 5 is a cross-section along the line 5—5, Figure 1.

Figure 6 is an end view of the guiding head of the tool, showing the cutting edge and plow in dotted lines.

In the carrying out of my invention $a$ is the guide head, $b$ the spindle, $c$ the shank, $d$ the tang, $e$ the plow, $f$ the cutting edge, all as shown in Figure 1. The relation of the plow $e$, cutting edge $f$ are clearly shown in Figure 2.

In Figure 3, I show a cross-section through a tube sheet or plate $g$ with the tube $h$ expanded into the hole, provided for it in the tube plate with the debonding tool inserted into the tube end. The guide head $a$ guides the tool forward parallel to the longitudinal axis of the tube until the plow $e$ slides in under the outside diameter of the rolled-in or expanded tube end $i$. As the sharp point of the plow $e$ is forced forward the inclined flat $j$ of the plow lifts the end of the tube $k$ and forces it against the cutting or slitting edge $f$ of the tool.

Continued driving or forcing the tool forward causes the tube to become slit further along until the curving face $l$ of the tool contacts the outside diameter of the slitted tube and then curls inward, the slit edges of the tube at the same time pulling the lower half of the tube away from the hole in the tube sheet, thereby breaking the bond between the tube and tube plate hole, making an easy removal of the tube possible, as clearly shown in Figure 4.

Figure 5 shows a cross-section through the tool spindle showing the curved-in curling edge $l$ referred to in connection with the foregoing description.

The two important features in the design and successful operation of my debonding tool lie in the fact that the contact surface $m$, Figure 5, of the spindle and bottom contact surface of the guide head $n$, Figure 6, are machined or turned to the same diameter as the inside diameter of the tube, less a suitable amount of clearance to permit a free sliding fit of the guide head $a$ into the tube.

The contact surface $o$ of the plow is turned or machined in relation to guiding surface $m$ to the same radius as the outside diameter of the hole in the tube plate.

With this novel design, as the guide head $a$ enters the tube end and is forced further into the tube, the plow point $e$ registers exactly at the point of contact between the outside diameter of the hole in the tube plate. Continued pressure at the tang $d$ end of the tool forces the plow into this intersection and the contact surface of the plow $e$, Figure 1, being of the exact curvature as the tube plate hole, further forcing of the plow merely consists of two surfaces, having identical curvatures, sliding one over the other with no resultant damage to the tube plate.

I wish it distinctly understood that my tool herein illustrated and described is in the form in which I desire to construct it and that changes or variations may be made as may be convenient or desirable without departing from the salient features of my invention and I therefore intend the following claims to cover such modifications as naturally fall within the lines of invention.

I claim:

1. A tool of the class described for removing a tube from a tube sheet, formed of a single piece of metal, means to guide the tool within a tube parallel to the longitudinal axis of the tube to be removed, means located back of the said guiding means to plow and slit the tube and said last mentioned means including a rigid pointed member having two concave sides adapted to curl the slit edges of the tube inwardly thereby reducing the diameter of the tube to permit its removal from the tube sheet.

2. A tool of the class described for removing tubes from their tube sheet formed of a single piece of metal and having means on the forward end to guide the tool forward parallel to the longitudinal axis of the tube, means interposed between the ends of the tool for guiding the tool in the sheet after the bond between the hole in the tube sheet and the expanded tube end has been broken, means interposed between the two aforesaid guiding means for slitting the tube and curling the slit edges inwardly upon themselves to break the bond between the tube and sheet comprising a slitting member having two concave sides whereby the expanded portion of the tube is reduced in diameter so that it may be readily removed.

3. A tool of the class described having an elongated end, the top side of which when used in a horizontal position forms a guiding surface to guide the tool in the tube to be removed, a guide head on the forward end thereof extending downwardly, the lower face of which is adapted to cooperate with the guiding surface to guide the tool centrally along the longitudinal axis of the tube to be removed, a longitudinal rib extending downwardly from the guiding surface provided with concave longitudinal sides terminating in a cutting edge on the forward end thereof, the said cutting edge spaced back from the guide head on the end of the tool and in line therewith, the lower portion of the rib at the end thereof forming a plow, the lower surface of the rib and the guiding surface being radially sized to fit between the inside of the tube and the inside of the hole to be cleared of its tube.

4. A tool of the class described having an elongated end, the top side of which forms when used in a horizontal position a guiding surface on the forward end thereof, extending downwardly is a guide head the bottom face of which is adapted to cooperate with the guiding surface to guide the tool in a tube to be removed, a longitudinal rib extending downwardly from the guiding surface provided with concave sides terminating in a cutting edge on the forward end thereof, the said cutting edge spaced back from the guide head and in line therewith, the lower portion of the rib at the end thereof forming a plow, the lower edge of the rib and the guiding surface being radially sized to fit between the inside of the tube and the inside of the hole to be cleared of the tube.

CLAIR OTTO EVANS.

REFERENCES CITED

The following references are of record in the file of this patent:

UNITED STATES PATENTS

| Number | Name | Date |
| --- | --- | --- |
| 1,598,458 | Sullivan | Aug. 31, 1926 |
| 2,427,843 | Dugger | Sept. 23, 1947 |